United States Patent [19]

Clough

[11] 4,303,720

[45] Dec. 1, 1981

[54] DIELECTRIC PRODUCT

[75] Inventor: Philip J. Clough, Gorham, Me.

[73] Assignee: Ludlow Corporation, Needham Heights, Mass.

[21] Appl. No.: 167,361

[22] Filed: Jul. 10, 1980

Related U.S. Application Data

[63] Continuation-in-part of Ser. No. 913,250, Jun. 6, 1978, abandoned.

[51] Int. Cl.³ ........................ B32B 5/16; B32B 27/10; B32B 27/32

[52] U.S. Cl. ................................ 428/211; 260/42.46; 428/212; 428/328; 428/341; 428/513; 428/514; 428/537; 427/326; 427/408; 427/411; 427/419.5

[58] Field of Search ............... 428/513, 514, 328, 341, 428/539, 537, 211, 212; 260/42.46; 427/358, 326, 408, 411, 419 D

[56] References Cited

U.S. PATENT DOCUMENTS

| | | | |
|---|---|---|---|
| 3,385,730 | 5/1968 | Relph | 428/514 |
| 3,441,437 | 4/1969 | Epstein | 428/513 |
| 3,690,297 | 9/1972 | Dentch | 118/410 |
| 3,723,169 | 3/1973 | Guastella | 422/179 |
| 3,840,399 | 10/1974 | Kobayashi | 428/447 |
| 3,847,661 | 11/1974 | Hill | 428/513 |
| 3,919,164 | 11/1975 | Hattoni | 260/42.46 |
| 3,956,562 | 5/1976 | Shibata | 428/447 |
| 4,153,587 | 5/1979 | Mui | 260/42.46 |
| 4,175,977 | 11/1979 | Heaton | 106/272 |

*Primary Examiner*—Ellis P. Robinson
*Attorney, Agent, or Firm*—Robert A. Cesari; John F. McKenna; Andrew F. Kehoe

[57] ABSTRACT

An improved dielectric printing paper and process for making the same, characterized by excellent resolution, contrast, and feel. The paper incorporates an inorganic salt such as magnesium chloride as a conductivity-providing ingredient. The dielectric coating is formed with a high loading of inorganic fillers and is applied by a dry process to form a discontinuous dielectric coating on the conductive paper substrate.

21 Claims, 2 Drawing Figures

DIELECTRIC PRODUCT

RELATED APPLICATION

This application is a continuation-in-part of copending Ser. No. 913,250 filed June 6, 1978 by Philip J. Clough now abandoned.

BACKGROUND OF THE INVENTION

This invention relates to a dielectric printing paper, of the type used to selectively attract toner particles by use of differential electrostatic potential on the surface of the paper, and to an improved versatile process for making such a paper.

Electrostatic printing paper, or dielectric papers suitable for electrostatic printing as they are more properly described, are well known to the art. These papers are to be distinguished from the photosensitive papers which are commonly used with office copying equipment.

Dielectric printing is based on forming a charged area on a dielectric surface by electron-beam, or some other such selective surface charging means. The charged area is then directly contacted with a toner selectively attracted to the areas of the paper made electrically receptive to it. There is no intermediate light-caused discharging process, and photoconductive materials are not generally useful in dielectric printing processes using liquid toners and wherein, for example, a print speed of 18,000 lines per minute is typical. In general, dielectric copy sheets are used in high-speed copying processes. Papers heretofore used in such processes tend to be expensive because of their utilization of expensive organic conductivity-imparting additives, of relatively expensive coating substrates, and of relatively expensive dielectric coating procedures.

It has long been a problem to provide electrostatic printing papers having a high-filler content. For example, U.S. Pat. No. 3,847,661 is typical of a coating laid down from a liquid medium. There are a number of problems caused by such processes. If the liquid medium is a solvent for a polymeric matrix, then there is substantial contamination of the surfaces of filler product with the polymer as evaporation of the solvent takes place. This interferes with ink-receptively of the filler reducing substantially any absorbency of said filler for eventual use in imaging. If the liquid medium is water, then there is an increased chance of excessive filler polymer segregation and, moreover, there is often a tendency to disrupt the water-laid fibers of the paper being coated. Another problem with aqueous coating of the dielectric layer is the fact that one must, from a practical point of view, limit selection of the electrolyte, used to impart a degree of conductivity to the substrate paper, to one which has relatively low water solubility. Even with such a limitation made, the use of aqueous coating procedures in manufacturing operations can result in unwanted contamination of the dielectric coating with the substrate electrolyte. The process of U.S. Pat. No. 3,847,661 is characterized by a substantially continuous polymer layer and is limited to low pigment levels. U.S. Pat. No. 3,956,562 to Shibata discloses a process for increasing the filler content of coatings by pre-coating the particular with a plastic envelope which remains on the surface of the particle in the coating and, to that extent, interferes with the imaging performance contributed by the inorganic filler present on the surface of the paper. Even with the pretreatment, however, total particle content of the coating is limited.

In the above discussion, the term liquid coating systems relates to those using volatile organic solvents or water as coating vehicles of low viscosity.

It should be noted that this discussion of the prior art is made with knowledge of the present invention and after having an opportunity to evaluate the advantages of the present invention and the probable reasons for those advantages, in light of drawbacks of the prior art processes. It is not to be inferred that the disadvantages of the prior art or the reasons for such disadvantages were realized by prior artisans before the present invention was made.

SUMMARY OF THE INVENTION

It is a principal object of the invention to provide a dielectric printing paper of improved feel and excellent imaging characteristics.

It is a further object of the invention to provide a novel, versatile, process for making a dielectric printing paper.

Other objects of the invention are to provide a novel two-sided dielectric printing paper suitable for operation at high printing rates, as when it is fed from rolls and pre-folded continuous assemblies of paper, and a process for making such paper.

Still another object of the invention is to provide a relatively inexpensive dielectric copy sheet which has a dielectric coating characterized by an excellent combination of good opacity, gloss, charge-retention, response-speed, contrast, and image resolution.

A further object of the invention is to provide a dielectric copy sheet, and process for making the same, wherein a ground wood paper product, is utilized as a substrate for a dielectric coating.

Another object of the invention is to provide a process for making a dielectric print sheet wherein a better definition is maintained between conductive cellulosic substrate and the dielectric coating.

Still another object of the invention is to provide a print sheet of improved ink absorptivity on the inorganic filler particles coated thereon.

Other objects of the invention will be obvious to those skilled in the art of their reading this disclosure.

The above objects have been substantially achieved by the development of a dielectric printing sheet characterized by use of a dielectric coating on a relatively conductive substrate. A coating is discontinuous and to be contrasted with cast or solvent-coated coatings which are very limited in filler-bearing capacity and wherein the coating forms a continuous film over very substantial areas of the printing sheet including, often, only a partial coating of the filler near the surface of the sheet. The coating of the invention is comprised of inorganic fillers in a dielectric thermoplastic matrix. The fillers are non-photoconductive, and are carefully selected to provide a good combination of opacity, gloss, charge retention, response-speed, contract and image resolution characteristics without comprising the objective of obtaining a low-cost product.

The fillers are carried onto the substrate coated within a thermoplastic matrix polymer having suitable dielectric properties. The dry-coating process of the invention is believed to contribute a good "hand" to the paper and also to the excellent imaging characteristics because of the increased population of particles at the surface. It is particularly surprising that such a concentration of particles does not cause excessive electroconductivity of the coating. Indeed, the coated paper of the invention has sufficient toner compatibility that it is susceptible to graying by toner when it is processed at speeds substantially slower than the state-of-art printing speeds. At the higher speeds utilized in the art, the imaged paper has an excellent background, the toner not having the contact time required to penetrate and reside in the coating.

The surface resistivity between (a) the salt-impregnated portion of the sheet and (b) the dielectric surface should differ by at least four, but preferably about five or more orders of magnitude.

It has been discovered that particularly favorable results can be achieved when a substantial volume of the coating is inorganic filler. Preferably, the amount of filler used will be at least about 40% by weight, but most advantageously 50% or more by weight, of the coating. Barium sulfate advantageously comprises 50% or more of the filler and preferably 30% or more of the weight of the coating as a whole. Other fillers which can be used, preferably in small quantities, are titanium dioxide and zinc oxide. None of these materials, however, is as desirable for use as barium sulfate which, although relatively inexpensive, contributes excellent image-receiving properties. The coating weight is normally between 5 and 11 lbs per 3,000 square feet of coated paper.

Polyolefins, including olefinic copolymers, are among the polymers useful in the practice of the invention. Polyethylene is a highly adequate polymeric carrier for the fillers of the invention. A particular polyethylene, or any other polymer applied by the preferred coating procedures, is usually selected with attention to the flow characteristics of the polymer. Thus a low density, i.e. low melting and low crystallinity polymer is often most suitable. Polyethylenes sold under the trade designation DYLT by Union Carbide Corp. or Na250 and Na212 by U.S.I. Chemicals are suitable. However, even this material is beneficially modified with adhesion promoting and flow modifying resins such as, for example, polymerized olefins and diolefins and sold under the trade designations "Wingtack 95" by Goodyear, a hard synthetic, high melting point wax consisting essentially of a mixture of high molecular weight, saturated, straight chain, paraffin hydrocarbons, and a minor proportion of branched chain, paraffin hydrocarbons, e.g. those sold under the trade designation Paraflint H-1 by Moore and Munger.

In general, the critical physical properties of the polymer, insofar as the product is concerned, are its high resistivity and ability to contribute good dielectric characteristics of the coating. A large number of thermoplastic polymers can meet this criteria. In practice, however, there have been practical limitations for wet-coating processes based on the need to find an effective solvent system for the polymers to be used. This process of the invention by-passes such a limitation and also allows a discontinuous coating to be formed, allows superior surface exposure of the filler, and a better mechanical and electrical definition at the interface between paper substrate and dielectric coating.

By discontinuous coating is meant one wherein the particles are not in a such particle-to-particle contact which allows them to contribute excessive conductivity to the sheet and, on the other hand, the polymeric matrix is not in the form of a substantially continuous film of the type which dominates the surface characteristics of the paper by coating, and interfering with the absorbency of, the filler particles.

A particular advantage of the invention is the capability of constructing a valuable dielectric print sheet using a ground wood paper substrate. Thus, the economic advantage of the process of the invention inherent in avoiding solvent-coating procedures and using inexpensive conductors is increased by an ability to avoid the use of a calendered substrate. Calendered paper surfaces are disrupted when wet by either water or an organic solvent and "wild fibers" stand up on the surface due to the disruption. Using the process of the invention the surface is not disrupted but rather is actually improved by mechanically passing through the nip between the blade and the backing roll. It is not necessary to calender the stock before coating by this process. Even if the aqueous solution of magnesium chloride is applied first, it does not adversely affect the surface smoothness of the subsequently applied dry coating. This permits a lower weight of dry coating to be able to give a smooth surface on non-calendered sheets than is possible with solvent (either aqueous or organic) systems. Even groundwood type substrates need not be calendered, although it may prove desirable to do so depending on the particulars.

Other advantages of the process are its ability to withstand high speed operation, e.g. speeds of up to 1,500 to 4,000 feet per minute, its ability to be used with moisture bearing substrates. Indeed, there appears to be no reason that the coating step could not be an adjunct to the high rate apparatus used in commercial paper making processes.

The conductive salt is selected from any of a number of soluble salts which serve as a means to impart conductivity to the sheet and also as a humectant, thereby preserving the conductivity over a wide range of temperatures and levels of humidity. Magnesium chloride is wholly satisfactory for this purpose. Similar salts would be operable. The 100-volt surface resistance of the coated sheet is normally at least $10^{13}$ Ohms at 50% relative humidity and 70° F.

As will be clear to those skilled in the art, the product of the invention is usually sold in roll form or in the form of pre-folded, perforated assemblies.

ILLUSTRATIVE EMBODIMENTS OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

IN THE DRAWINGS

Figure 1:
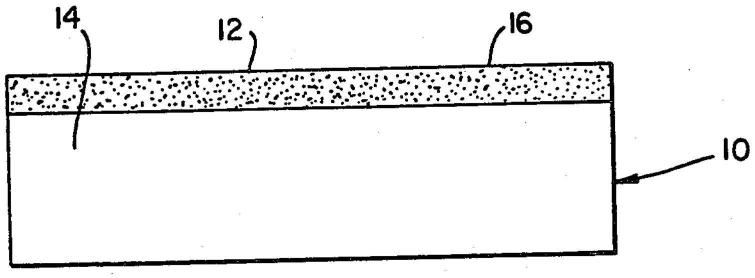
FIG. 1 illustrates, schematically, a dielectric printing sheet of the invention.

FIG. 1 illustrates a conventional dielectric printing sheet 10 according to the invention wherein a dielectric coating 12 is coated on a salt-impregnated substrate 14.

Coating 12 comprises 50% by weight of inorganic filler 16. Substrate 14, a ground wood-type paper, comprises a magnesium-chloride impregnant.

Figure 2:
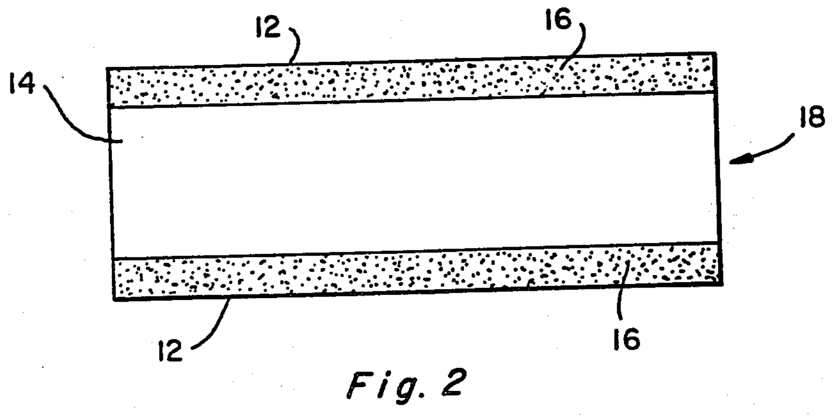
FIG. 2 illustrates, schematically, a double-coated printing sheet of the invention.

FIG. 2 is a dielectric sheet 18 similar to that of FIG. 1 excepting sheet 18 is coated on both sides with a dielectric coating of the invention.

It is particularly advantageous, in the process of the invention, that a suitable degree of surface smoothness can be achieved even without calendering operations. Sheffield surface smoothness values, known in the art, can be readily tailored in the range of 150–240 without calendering. If smoother surfaces are desired, it is usually convenient to use a calendering step in which case smoothness values as low as 100 can be achieved. Usually smoothness values in the range of 125–225 will be acceptable, the optimum value depending upon the precise nature of the imaging process in which the paper is to serve as a substrate.

For many applications, it has been found desirable to use relatively tougher, i.e., relatively attrition-resistant compositions. Polystyrene, amorphous or non-crystalline polyesters, polyamides, thermoplastic polyurethane, mixtures of various extrusion grade polymers inclusive of block coploymer compatibilizing agents as known to the art, and the like are suitable as are many other polymers now utilized in more conventional extrusion coating and extrusion processes.

EXAMPLE 1

A base paper, bleached kraft, of a weight 33 lbs. per 3,000 square feet (e.g. about 50 grams per square meter), is impregnated with an aqueous solution of magnesium chloride. The application is carried out to assure about 0.6 lbs. of the salt is distributed throughout each 3,000 square feet of paper, e.g. about 1.5% of the weight of the impregnated paper.

A dielectric coating material is prepared from the following ingredients:

| | % by Weight |
|---|---|
| $TiO_2$ (rutile) | 20% |
| $BaSO_4$ | 30% |
| Polyethylene (Na212 from USI Chemical) | 40% |
| Wingtack 95 | 5% |
| Paraflint H-1 | 5% |

The primary polyethylene is a low density, e.g. low-crystalline material. This coating material, when applied, exhibits an excellent combination of whiteness, electrical resistivity, receptivity to commercial liquid toners, dry toners and low gloss. Aesthetically, a paper coated therewith compares well with untreated bond paper and is an improvement over more expensive, commercially-accepted, dielectric papers.

The coating is applied at about 6 lbs. per 3,000 (square) feet (about 10 grams per square meter) by conventional dry coating procedures, e.g. that process described in U.S. Pat. Nos. 3,690,297 and 3,723,169. The material is applied at 1,200 feet per minute at a temperature of 400° F.

In general, this procedure provides for the direct coating of the formulation by melting and without use of ancilliary solvent carriers. The resulting coating is discontinuous and it is believed that the excellent feel of the resulting paper is at least partially assignable to this fact.

The resultant dielectric paper exhibits surface resistivities as follows:

| Applied Potential: | 100 volts | 500 volts |
|---|---|---|
| Dielectric Side: | $5 \times 10^{13}$ ohms/sq | $2.8 \times 10^{12}$ohms/sq |
| Conductive Side: | $7.5 \times 10^{7}$ ohms/sq | $5.2 \times 10^{7}$ ohms/sq |

The conductivity characteristics of the paper remain acceptable when the paper is stored at relative humidities of from 20 to 70%, and indeed from 10 to 90%, at temperatures from 20° F. to 120° F.

The resultant sheet was used successfully in conjunction with a commercial printing machine (Honeywell PPS printer) at a rate of 18,000 lines per minute.

EXAMPLE 2

Example 1 is repeated excepting that the dielectric coating was carried out before the aqueous salt solution impregnation.

EXAMPLE 3

Example 1 is repeated and, thereafter, a second dielectric coat of the same material is placed on the second side of the previously impregnated and coated paper. The resulting paper is of excellent hand and performs well in electrostatic printing of both sides.

It will be understood that in one-side printing papers, the reverse (conductive) side is grounded and the electrostatic charge is placed on, and held in the localized imaging areas, i.e. areas to which toner is attracted. In two-sided embodiments, the grounding electrode is coupled to the conductive inner zone of the sheet.

EXAMPLE 4

The following formula was utilized to prepare the dielectric coating:

| | |
|---|---|
| $BaSO_4$ | 40% |
| Zinc Oxide | 10% |
| Polyethylene | 40% |
| Paraflint H-1 | 5% |
| Wingtack 95 | 5% |

The zinc oxide was that available from New Jersey Zinc under the trade designation Kadox 15. It is not a photosensitive grade.

The coating was applied to a conductive substrate, as described in Example 1.

Surface resistivities of the paper were as follows:

| Applied Potential | 100 Volts | 500 Volts |
|---|---|---|
| Dielectric Side | $5 \times 10^{13}$ ohm/sq | $5 \times 10^{12}$ ohm/sq |
| Conductive Side | $2 \times 10^{7}$ ohm/sq | 1.6 $10^{7}$ ohm/sq |

This paper also performed well on a 18,000-line per minute dielectric printer.

In general, coating compositions of Examples 5–7 have better mechanical strength than do the coatings based on a polyolefins matrix. This may be important in some applications. Also, it is found that better image resolution is achieved with the polystyrene coatings. The coatings are conveniently 9 lbs. per 3,000 square feet:

EXAMPLE 5

35 lbs. Polystyrene molding powder sold by Amoco under the trade designation G3-F1.

5 lbs. Polymeric viscosity modifier sold by U.S.I. Chemicals under the trade designation NA-250.

50 lbs. Barium sulfate powder (less than 5 micron average particle size).

5 lbs. Titanium dioxide sold by N.L. Industries under the trade designation Titanox 2071.

5 lbs. of polyolefin sold by Goodyear under the trade designation Wingtack 95.

EXAMPLE 6

40 lbs. of polystyrene sold by Amoco under the trade designation G3-CO.

5 lbs. of Wingtack 95.

50 lbs. of barium sulfate.

5 lbs. of titanium dioxide.

EXAMPLE 7

50 lbs. of polystyrene sold by Amoco under the trade designation G3-F1.

5 lbs. of Wingtack 95.

40 lbs. of barium sulfate.

5 lbs. of titanium dioxide.

It is particularly noted that the demarcation between the electrolyte-bearing substrate paper and the coating is excellent in papers coated according to the process of the invention. Under a magnification of 650 times, this is manifested by a substantially well-defined line which is free of incursions of coating material into the substrate and free of fiber disruption of the substrate at the interface.

It is also to be understood that the following claims are intended to cover all of the generic and specific features of the invention herein described and all statements of the scope of the invention which might be said to fall therebetween.

What is claimed is:

1. A dielectric paper sheet of the type useful in dielectric printing processes, said paper sheet comprising a cellulosic paper substrate with an inorganic salt distributed therein in a quantity effective to form means to impart conductivity to said sheet when said sheet is equilibrated at 25° C. at relative humidities from 20 to 70%, the improvement wherein said substrate comprises a discontinuous dielectric printing coating on the surface thereon, said coating being formed of an organic polymer and filled with at least 40% inorganic fillers and having a minimum resistivity four orders of magnitude greater than the resistivity of said substrate, and wherein the said fillers are preferentially concentrated at the outer surface of said coating.

2. A dielectric sheet as defined in claim 1 bearing said coating on each side of said substrate.

3. A sheet as defined in claim 1 wherein said coating is discontinuous, is coated on said paper substrate at from about 5 to 11 lbs. per 3,000 square feet, and has a 100 volt surface resistance of at least about $10^{13}$ ohms at 50% relative humidity and 70° F.

4. A sheet product as defined in claim 1 wherein said salt is magnesium chloride.

5. A sheet as defined in claim 2 wherein said coating is discontinuous, is coated on said paper substrate at from about 5 to 11 lbs. per 3,000 square feet, and has a 100 volt surface resistance of at least about $10^{13}$ ohms at 50% relative humidity and 70° F.

6. A sheet product as defined in claim 1 wherein said printing coating comprises at least about 30% by weight of barium sulfate.

7. A sheet product as defined in claim 1 wherein said organic polymer is a polyolefin.

8. A sheet product as defined in claim 2 wherein said inorganic filler comprises at least about 50% by weight of barium sulfate.

9. A sheet product in claim 5 wherein said organic polymer is a polyolefin.

10. A sheet product as defined in claim 3 wherein said inorganic filler comprises at least about 50% by weight of barium sulfate.

11. A sheet product as defined in claim 3 wherein said organic polymer is a polyolefin.

12. A sheet product as defined in claim 10 wherein said organic polymer is a polyolefin.

13. A sheet product as defined in claim 1 formed of a ground-wood substrate.

14. A sheet product as defined in claim 2 formed of a ground-wood substrate.

15. A sheet product as defined in claim 6 formed of a ground-wood substrate.

16. A sheet product as defined in claim 7 formed of a ground-wood substrate.

17. A sheet product as defined in claim 10 formed of a ground-wood substrate.

18. A sheet of as defined in claim 2 wherein said salt is magnesium chloride.

19. A sheet as defined in claim 3 wherein said salt is magnesium chloride.

20. A sheet as defined in claim 1, 2 or 3 wherein said resistivity of said dielectric coating is at least $10^{12}$ ohms.

21. A sheet as defined in claims 1, 2, 3, 6, 10 or 13, wherein said organic polymer comprises a major portion of polystyrene.

* * * * *

UNITED STATES PATENT AND TRADEMARK OFFICE

CERTIFICATE OF CORRECTION

PATENT NO. : 4,303,720

DATED : December 1, 1981

INVENTOR(S) : Philip J. Clough

It is certified that error appears in the above-identified patent and that said Letters Patent are hereby corrected as shown below:

Column 2, line 45 - Change "of" to -- on --;

Column 8, line 44 - Delete "of".

Signed and Sealed this

*Seventeenth* Day of *August 1982*

[SEAL]

*Attest:*

GERALD J. MOSSINGHOFF

*Attesting Officer* *Commissioner of Patents and Trademarks*